(12) United States Patent
Laamanen et al.

(10) Patent No.: US 7,512,191 B2
(45) Date of Patent: Mar. 31, 2009

(54) METHOD AND APPARATUS FOR IMPLEMENTING A CHANNEL CORRECTION IN A DIGITAL DATA LINK

(75) Inventors: Heikki Laamanen, Espoo (FI); Janne Väänänen, Espoo (FI)

(73) Assignee: Tellabs Oy, Espoo (FI)

( * ) Notice: Subject to any disclaimer, the term of this patent is extended or adjusted under 35 U.S.C. 154(b) by 835 days.

(21) Appl. No.: 10/169,943

(22) PCT Filed: Oct. 16, 2000

(86) PCT No.: PCT/FI00/00897

§ 371 (c)(1),
(2), (4) Date: Jul. 11, 2002

(87) PCT Pub. No.: WO01/54368

PCT Pub. Date: Jul. 26, 2001

(65) Prior Publication Data

US 2003/0035495 A1    Feb. 20, 2003

(30) Foreign Application Priority Data

Jan. 18, 2000    (FI) .................................. 20000100

(51) Int. Cl.
    *H04L 25/49* (2006.01)
(52) U.S. Cl. ....................................................... 375/296
(58) Field of Classification Search ................. 375/295, 375/296, 229, 232–233
    See application file for complete search history.

(56) References Cited

U.S. PATENT DOCUMENTS

| 4,459,698 | A | * | 7/1984 | Yumoto et al. ............... 375/236 |
| 5,396,519 | A | | 3/1995 | Betts et al. |
| 5,513,216 | A | * | 4/1996 | Gadot et al. ................. 375/233 |
| 5,602,583 | A | * | 2/1997 | Citta ........................... 348/21 |
| 5,881,108 | A | * | 3/1999 | Herzberg et al. ............. 375/296 |
| 5,881,363 | A | | 3/1999 | Ghosh et al. |
| 6,243,425 | B1 | * | 6/2001 | Langberg et al. ............. 375/285 |
| 6,400,761 | B1 | * | 6/2002 | Smee et al. ................... 375/232 |
| 2004/0252755 | A1 | * | 12/2004 | Jaffe et al. ................... 375/233 |

FOREIGN PATENT DOCUMENTS

CA    2153641 A1    1/1997

(Continued)

OTHER PUBLICATIONS

Lee et al, Kluwer Academic Publishers, 1994, second edition, secs. 11.1.2,11.3.1.*

(Continued)

*Primary Examiner*—Kevin M Burd
(74) *Attorney, Agent, or Firm*—Birch, Stewart, Kolasch & Birch, LLP

(57) ABSTRACT

The present invention concerns adjustment of tap coefficients of a Tomlinson-Harashima precoder in a digital communications path during a data transmission state. According to the invention, the tap coefficients of the Tomlinson-Harashima precoder are adjusted based on content values of a delay line of the Tomlinson-Harashima precoder and on an error variable associated with a receive. Synchronization between the error value and the content values of the delay line is performed according to line frame synchronization information.

15 Claims, 11 Drawing Sheets

FOREIGN PATENT DOCUMENTS

WO         WO 9839873 A1 *   9/1998
WO         98/48545 A2     10/1998

OTHER PUBLICATIONS

Gerstacker et al., In: IEEE Global Telecommunications Conference, Globecom '97. 1997, vol. 1, pp. 52-56.

Fischer et al., In: IEEE Journal on Selected Areas in Communications, Dec. 1995, vol. 13, No. 9, pp. 1622-1633.

Gibbard et al., In: IEEE Transactions on Vehicular Technology, Nov. 1999, vol. 48, No. 6, pp. 2053-2064.

Lee et al., Kluwer Academic Publishers, 1994, second edition, Secs. 11.1.2, 11.3.1.

Eyuboglu, M.C. and Forney Jr., G.D., "Trellis Precoding: Combined Coding, Precoding and Shaping for Intersymbol Interference Channels" IEEE Transactions on Information Theory 38:2:I:301-314, 1992.

* cited by examiner

METHOD AND APPARATUS FOR IMPLEMENTING A CHANNEL CORRECTION IN A DIGITAL DATA LINK

FIELD OF THE INVENTION

The invention relates to a method for implementing channel equalization on a digital communications path.

The invention also relates to a system for performing channel equalization on a digital communications path, as well as a transmitter suited for performing channel equalization on a digital communications path.

BACKGROUND OF THE INVENTION

In the transmission of digital data, or a bit stream, over a communications channel 2, the bit stream is converted in a transmitter (TX) into an analog signal that is capable of passing through the communications channel. The communications channel may be a radio path, copper wireline or fiber-optic cable. On the basis of the received analog signal, the receiver (RX) performs a recovery of the sent bit stream as error-free as possible. The bit stream reconstruction performed in the receiver is complicated by signal distortion and noise summed with the signal on the communications channel. Due to these side-effects, a portion of the reconstructed bits are erroneous (e.g., on an average, 1 bit per $10^7$ bits may be erroneous).

The signal distortion originating from the transmission path is generally compensated for by means of equalizers that are located in the receiver, the transmitter or partially in both of these. The equalizers may be of a fixed or adaptive type. Respectively, the effect of noise is compensated for by means of different coding techniques such as Reed-Solomon coding, convolution coding, trellis coding, turbo coding and others.

A generally used correction method of channel distortion is the use of a linear adaptive equalizer (FFE). However, a linear equalizer alone may give an insufficient correction on certain channels. This kind of situation may be encountered when the transfer function of the signal band includes zero points, whereby certain frequency components cannot be passed over the communications channel 2. Then, a feedback equalizer is used to compensate for the distortion caused by the spectral nulls of the signal band. Also in a system wherein the channel 2 has no spectral nulls, the use of a feedback equalizer is often advantageous inasmuch it improves the noise tolerance of the system. If the feedback equalizer is located in the receiver, it is called a decision-feedback equalizer (DFE), while an equalizer located in the transmitter is called a Tomlinson-Harashima precoder. A system may also have both a DFE and a TML. Furthermore, the linear equalizer may be situated in the receiver, the transmitter or a portion of the equalizer may be in the transmitter while the other portion is in the receiver.

In the text describing the prior art and the features of the present invention, the following abbreviations are used:

| | |
|---|---|
| CAP | Carrierless amplitude and phase modulation |
| DFE | Decision-feedback equalizer |
| FFE | Feedforward equalizer, also known as a linear equalizer |
| PAM | Pulse amplitude modulation |
| QAM | Quadrature amplitude modulation |
| RX | Receiver |
| TX | Transmitter |
| TML | Tomlinson-Harashima precoder. |

In the following, a digital communications channel is examined in terms of the training phase of its adaptive equalizers. The line code used on the channel may be implemented using either pulse-amplitude modulation (PAM), quadrature-amplitude modulation (QAM) or carrierless amplitude and phase modulation (CAP). In FIG. 1 is shown a model for a system implemented using conventional techniques, wherein the receiver is provided with an adaptive linear equalizer (FFE) and an adaptive decision-feedback equalizer (DFE) (cf. Lee & Messerschmitt). The effect of fixed filters and possible modulation schemes are included in the channel noise model (CHN). The outgoing bit stream is coded into symbols (S) that are sent through the channel 2. In the receiver, the output signal of the channel 2 is processed by equalizers (FFE and DFE), and the decisions on symbols (S') are made from the equalized signal. The decision resulting in the resolved symbol (S') is also called the estimated received symbol. Both adaptive equalizers are adapted to the characteristics of the channel 2 during the training period carried out when a connection is being established. The equalizers are also continually adjusted during the period of data transmission in order to compensate for possible changes in the channel 2. The equalizers are adapted and controlled on the basis of the detection error (e) of the receive signal.

In FIG. 2 is shown another system according to the prior art (cf. Lee & Messerschmitt). The receiver has an adaptive linear equalizer (FFE), while the transmitter has a feedback equalizer (of the TML type). During the teaching period, also this system operates in the same fashion as that illustrated in FIG. 1 using a linear equalizer and a decision-feedback equalizer (DFE). At the end of the training period, the tap-weight values of the decision-feedback equalizer (DFE) are transmitted over an upstream auxiliary channel to the transmitter, wherein they are utilized in the configuration of a Tomlinson-Harashima precoder (TML). The linear equalizer (FFE) of the receiver is adjusted during the data transmission state, but due to the fixed configuration of the decision-feedback equalizer (TML) of the receiver, the latter equalizer will not be adjusted.

A benefit of Tomlinson-Harashima precoding over a DFE is that preceding does not cause feedback of a detection error as is the case in a DFE. Particularly when the shape of the amplitude response of the communications channel 2 is such that large values of tap coefficients must be used in the DFE, a really complex problem evokes from the feedback of erroneous decision-making in the detector. In the most serious situations, a single erroneous decision may cause loss of connection when in a system using a DFE.

Generally, changes in the characteristics of a communications channel 2 can be compensated for by adjusting the linear equalizer alone. However, in some cases the communications channel 2 may include analog bandstop filters serving to eliminate radio-frequency interference, for instance. The positions of the spectral nulls caused by the analog bandstop filters in the frequency spectrum may vary as the component values of the filters change with temperature. This kind of variation in the characteristics of the communications channel 2 cannot be compensated for simply by adjusting the linear equalizer. Another complication arises from the incapacity of the system to cope in an optimal manner with varying noise conditions if the decision-feedback equalizer is not adjusted during the data transmission state.

In FIG. 3 is illustrated a prior-art method used for solving the above-described problem. Herein, the system comprises a linear equalizer (FFE), a Tomlinson-Harashima precoder (TML) and decision-feedback equalizer (DFE). During the training period, the system comprises the FFE and the DFE alone. At the end of the training period, the tap coefficient values of the DFE are sent to the precoder (TML) included in the transmitter and the tap coefficient values of the DFE are reset to zero. During the data transmission state, both the FFE and the DFE are adjusted, but not the precoder (TML). A benefit of this arrangement is that the problems associated with such changes in the communications channel characteristics and noise conditions that cannot be coped with merely by adjusting the linear equalizer are overcome, because also the DFE of the receiver can be adjusted during the data transmission state. A disadvantage still remains from the risk of erroneous decision feedback due to the DFE of the receiver. The tap coefficients of the DFE in the receiver may be assumed to have smaller values than in the situation illustrated in FIG. 1 inasmuch a portion of the feedback equalization is performed already in the transmitter. Consequently, also the effect of erroneous decision feedback is less severe than in the configuration shown in FIG. 1. However, the system performance remains substantially dependent on how large changes may occur in the characteristics of the communications channel 2 and system noise condition in regard to the preceding situation prevailed during the training period.

A straightforward approach to improve the system shown in FIG. 2 or 3 would be to compute the incremental values of tap coefficient adjustments in the receiver from the detector error and symbol decisions in the same manner as when adjusting a DFE, but then transmitting the computed incremental values of adjustment over an auxiliary channel of the reverse transmit direction to the transmitter. These incremental adjustment values are then used for updating the tap coefficient values of the precoder in the transmitter. Accordingly, the precoder could be adjusted also during the data transmission state, whereby the receiver DFE would become redundant or the high values of its tap coefficients can be limited. However, it can be shown that this kind of equalizer adjustment method is not practicable in a general case.

SUMMARY OF THE INVENTION

It is an object of the present invention to overcome the drawbacks of the above-described techniques and to provide an entirely novel type of method and apparatus for use on a digital communications channel.

The goal of the invention is achieved by way of adjusting a conventional Tomlinson-Harashima precoder during the data transmission state. The adjustment is implemented in a system according to the invention so that the detector input signal of the receiver is transmitted back to the transmitter over an auxiliary channel of the reverse transmit direction and the tap coefficients of the precoder are then adjusted on the basis of the detector error and with the help of the precoder delay line using, e.g., an LMS algorithm.

As a first aspect of the invention a method for implementing channel equalization on a digital communications path is provided. According to the method, a transmitter converts an outgoing bit stream into symbols to be sent, and compensates a channel distortion with a Tomlinson-Harashima precoder in the transmitter. The transmitter further sends precoded symbols to a communications channel, such that the precoded symbols represent a signal constituting a channel output signal at a destination end of the communications channel. Also, according to the method, a receiver forms estimated symbol values on the basis of the channel output signal and recovers a bit stream on the basis of the estimated symbol values. Also according to the method, during a data transmission state, adjustment of tap coefficients of the Tomlinson-Harashima precoder is performed based on content values of a delay line of the Tomlinson-Harashima precoder and a value of an error variable that is dependent on a difference between a signal measurable in the receiver and either a sent symbol value or an estimated symbol value. This signal is measured in the receiver at a point where an absolute value of the difference attains its minimum when the adjustment is in a steady state. Also, during the data transmission state, the error variable is synchronized with the content values of the delay line of the Tomlinson-Harashima precoder with the aid of line frame synchronization information.

As a second aspect of the invention a system for implementing channel equalization on a digital communications path is provided. Such a system includes a transmitter that converts a bit stream into symbols to be sent, the transmitter including a Tomlinson-Harashima precoder for compensating a channel distortion. The system also includes a communications channel for transferring precoded symbols, such that the precoded symbols represent a signal constituting a channel output signal at a destination end of the communications channel. Also, the system includes a receiver that forms estimated symbol values on the basis of the channel output signal and recovers a bit stream on the basis of the estimated symbol values. Also, the system is configured to adjust tap coefficients of the Tomlinson-Harashima precoder (TML) during a data transmission state based on content values of a delay line of the Tomlinson-Harashima precoder and a value of an error variable that is dependent on a difference between a signal measurable in the receiver and either a sent symbol value or an estimated symbol value. This signal is measured in the receiver at a point where an absolute value of said difference attains its minimum when the adjustment is in a steady state. Also, the system is configured to determine the value of the error variable, and synchronize the error variable with the content values of the delay line of the Tomlinson-Harashima precoder with the aid of line frame synchronization information.

As a third aspect of the invention a transmitter for implementing channel equalization on a digital communications path is provided. The transmitter includes a device for converting a bit stream into symbols, and a Tomlinson-Harashima precoder for compensating a channel distortion. The transmitter is also configured to adjust tap coefficients of the Tomlinson-Harashima precoder (TML) during a data transmission state based on content values of a delay line of the Tomlinson-Harashima precoder and on an error variable, an absolute value of which attains its minimum when the adjustment is in a steady state. Also, the transmitter is configured to receive from a reverse direction auxiliary channel such information that determines the value of the error variable, and synchronize the error variable with the content values of the delay line of the Tomlinson-Harashima precoder with the aid of line frame synchronization information.

The invention offers significant benefits.

The invention allows the precoder to adapt in a continuous manner also during the data transmission state to changes occurring in the noise conditions on the communications channel 2 and also to changes in the properties of analog filters due to temperature variations and to drift caused by other factors.

BRIEF DESCRIPTION OF THE DRAWINGS

In the following, the invention is described in more detail with reference to exemplifying embodiments elucidated in the appended drawings in which.

DETAILED DESCRIPTION OF THE INVENTION

Each one of the equalizers in FIGS. 1-11 may be adjustable or fixed except for the precoder TML that according to the invention in all cases is adjustable.

Figure 1:
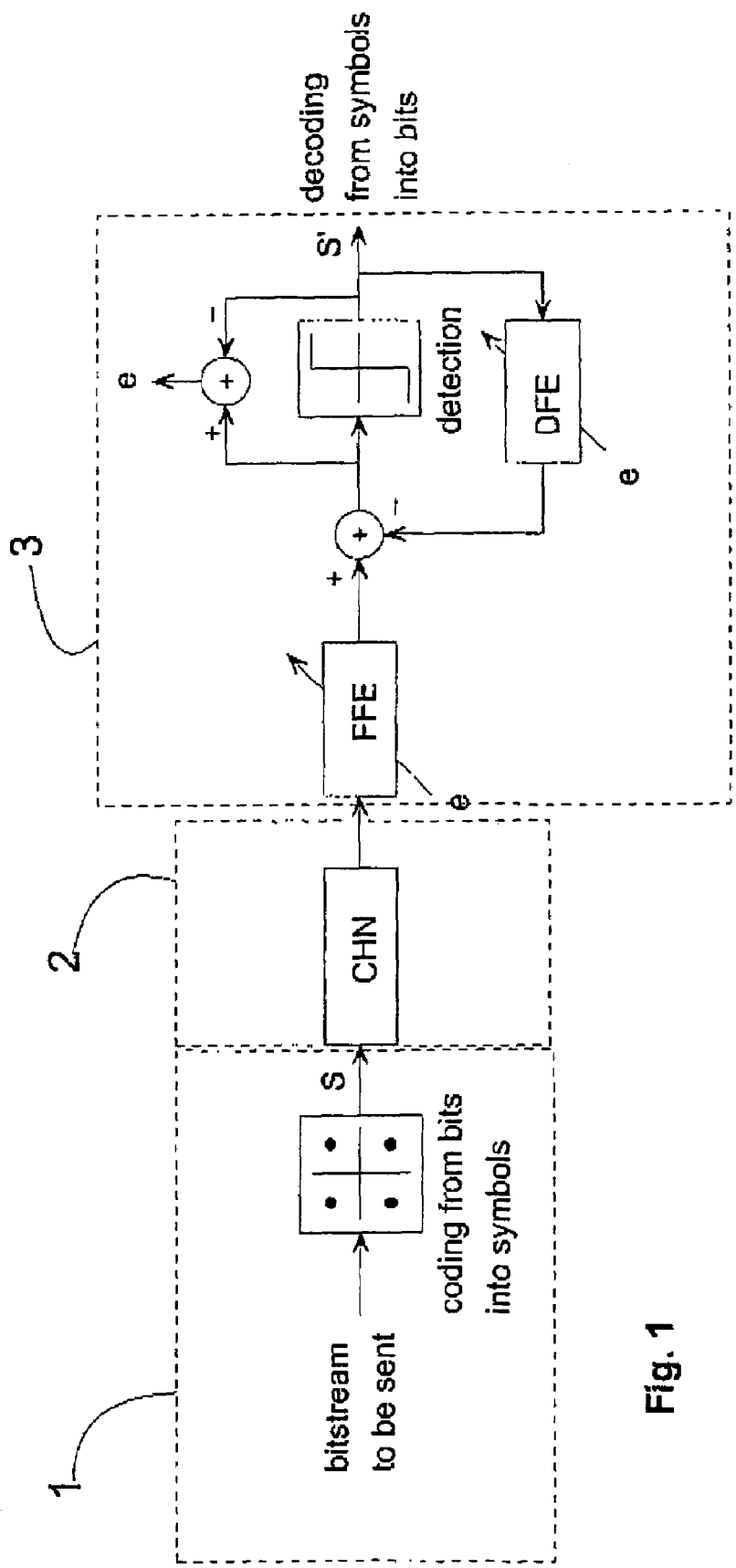
FIG. 1 shows a block diagram of a system of the prior art for implementing channel equalization.
Figure 2:
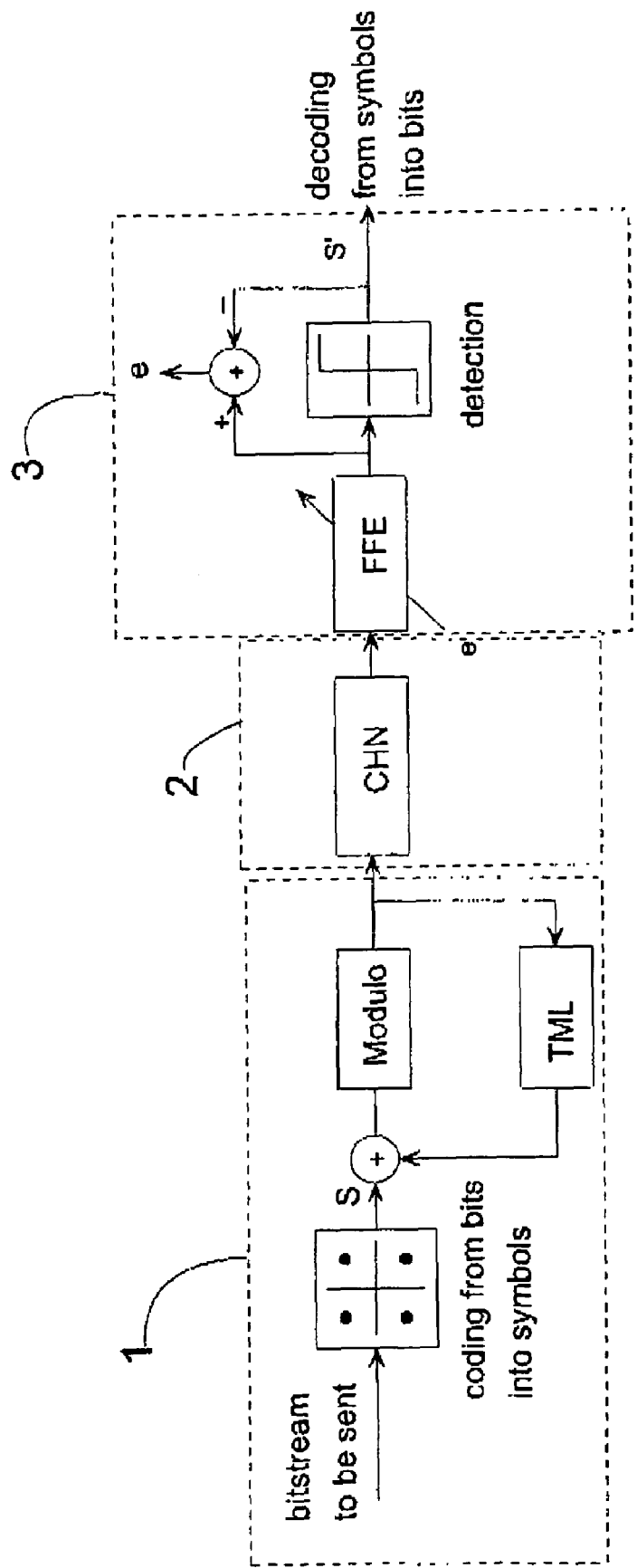
FIG. 2 shows a block diagram of a second system of the prior art for implementing channel equalization.
Figure 3:
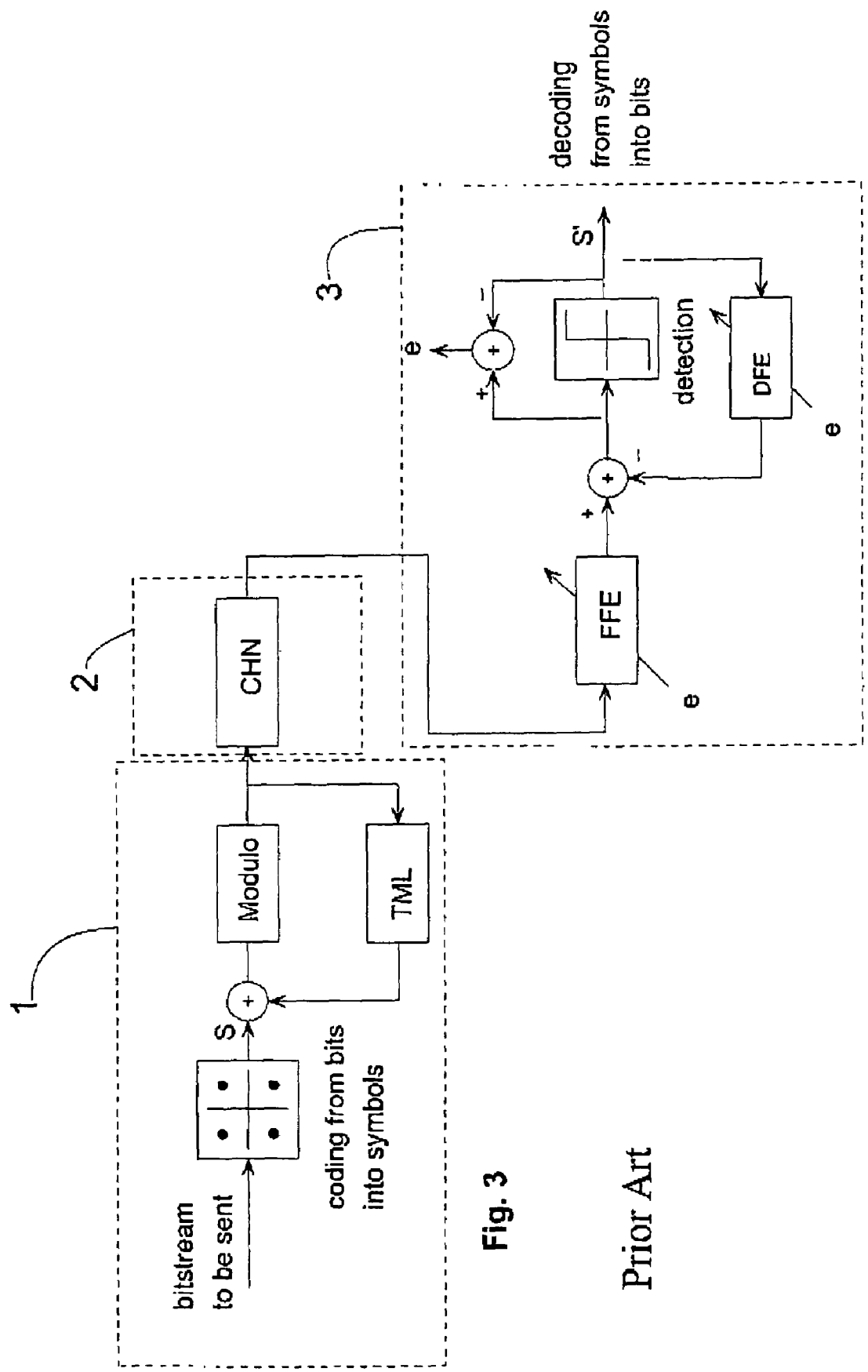
FIG. 3 shows a block diagram of a third system of the prior art for implementing channel equalization.
Figure 4:
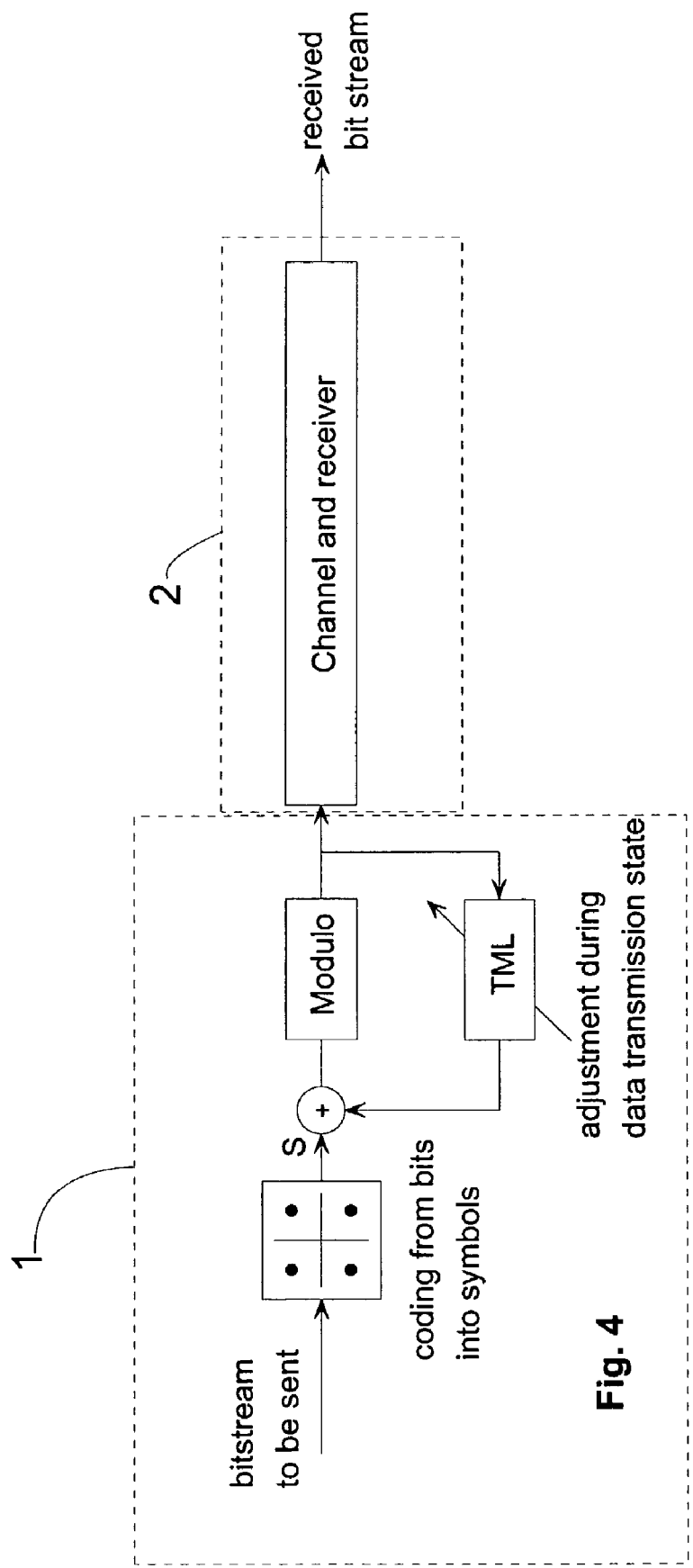
FIG. 4 shows a simplified block diagram of a system according to the invention.

Accordingly, the invention concerns a method and apparatus suitable for implementing a communications system, wherein a Tomlinson-Harashima precoder is adjusted during the data transmission state, see FIG. 4. The theoretical basis of the method will be evident to the reader from the discussion given below.

Figure 5:
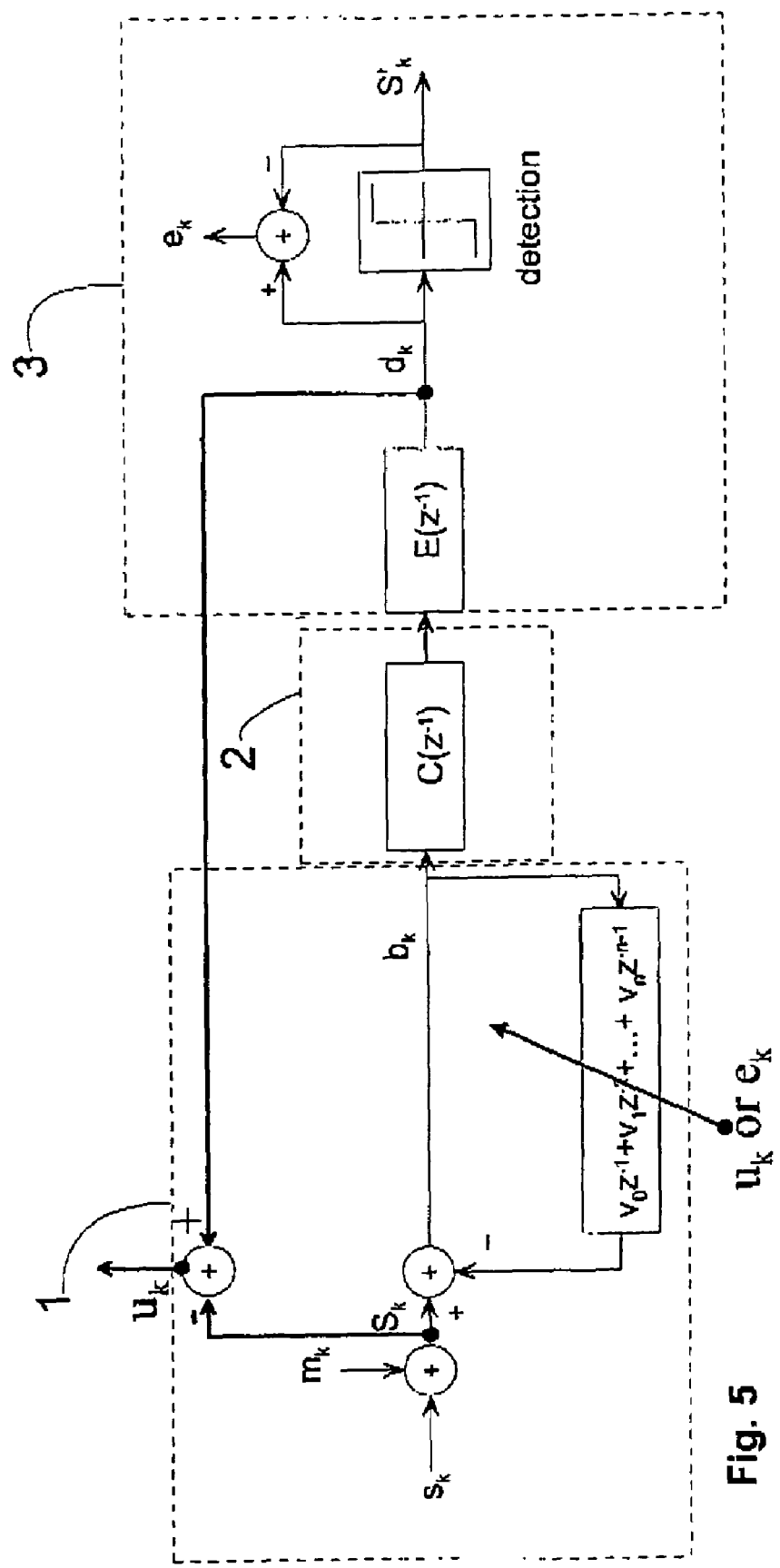
FIG. 5 shows a more detailed block diagram of a system according to the invention and its mathematical model.

Referring to FIG. 5, therein is shown a discrete-time model of a system equipped with Tomlinson-Harashima precoding. The result of the modulo operation, which is an integral part of the precoding step, is included in the transmitted symbol. Basics on Tomlinson-Harashima precoding can be found, e.g., in cited reference (Lee & Messerschmitt).

The following symbol notification will be used in the discussion:

$C(z^{-1})$ transfer function of communications channel 2 (includes fixed filters, modulation systems, etc.)

$E(z^{-1})$ transfer function of linear equalizer $S_k$ kth sent symbol of extended symbol constellation=initial symbol constellation $(s_k)$+result of modulo operation $(m_k)$ $S'_k$ symbol decision for above sent symbol using extended symbol constellation in receiver $d_k$ detector input signal in receiver for above sent symbol $e_k$ detector error in symbol decision $S'_k$ $h_0, h_1, h_2, \ldots$ impulse responses for $H(z^{-1})$; $H(z^{-1})=C(z^{-1})E(z^{-1})$ $v_0, v_1, v_2, \ldots v_n$ tap coefficients of Tomlinson-Harashima precoder $b_k$ output signal of Tomlinson-Harashima precoder Referring to FIG. 5, the precoder output is:

$$b_k = S_k - \sum_{i=1}^{n} b_{k-i} v_i$$

In the system response function, the precursor equalizer sets to zero all the tap coefficients preceding the decision-making tap (main tap), whereby the impulse response of $C(z^{-1})E(z^{-1})=H(z^{-1})$ is of the form:

$0, 0, \ldots, 0, 1, r_k, r_{k+1}, r_{k+2}, \ldots$

To simplify the notation, the zero-set taps are ignored (corresponding to an ideal delay) and the impulse response of $H(z^{-1})$ is denoted as follows:

$1, h_1, h_2, \ldots$, where $h_1=r_k$, $h_2=r_{k+1}, \ldots$.

Respectively, the detector input is:

$$d_k = b_k + \sum_{i=1}^{\infty} b_{k-i} h_i$$

and $$d_k = S_k - \sum_{i=1}^{n} b_{k-i} v_i + \sum_{i=1}^{\infty} b_{k-i} h_i = S_k + \sum_{i=1}^{n} b_{k-i}(h_i - v_i) + \sum_{i=n+1}^{\infty} b_{k-i} h_i,$$

wherefrom the value of error variable is obtained:

$$u_k = d_k - S_k = \sum_{i=1}^{n} b_{k-i}(h_i - v_i) + \sum_{i=n+1}^{\infty} b_{k-i} h_i.$$

The thus obtained error $u_k$ is equal to the detector error $(e_k)$ measured at the receiver if a correct symbol decision (that is, $S'_k=S_k$) has been made.

It can be shown that the successive values of Tomlinson-Harashima precoder outputs $(b_k, b_{k+1}, b_{k+2}, \ldots)$ are noncorrelating with each other (cf. Lee & Messerschmitt). Thence, a parameter value that is required in the adjustment of the precoder tap coefficients and is proportional to the tap coefficient error $(h_i-v_i)$ can be obtained by correlating the detector error with an element of the precoder delay line, that is:

$E\{b_{k-i}^* u_k\}=\sigma_b^2(h_i-v_i)$, since $E\{b_{k-i}^* b_{k-i}\}=\sigma_b^2$ ($\sigma_b^2$=output power of precoder) and $E\{b_{k-i}^* b_{k-j}\}=0$, when $i \neq j$.

Herefrom, it is possible in principle to solve the values of tap coefficients with which the precoder can most precisely compensate for the distortion in the communications channel 2. Solving the equations gives:

$$v_i^{new} = v_i + \frac{E\{b_{k-i}^* u_k\}}{\sigma_b^2} = h_i,$$

where $v_i^{new}$ is the updated tap coefficient of the precoder and index i=1 ... n (number of taps). In the equations, superindex notation "*" refers to a complex conjugate.

From the above analysis, it is obvious that the tap coefficients of a Tomlinson-Harashima precoder can be adjusted by the least mean squares algorithm (LMS) using the error difference between the detector input and the transmitted symbol (dk−Sk), and the values contained by the precoder delay line. In a practicable implementation, the formula of the estimated values is replaced by the following control algorithm of tap coefficients:

$v_i^{uew}=v_i+\mu b_{k-i}^* u_k$, where μ is the control increment. The equation may also be written using the value $e_k$ of the error.

By way of a similar analysis, a variable which is proportional to the error in the adjustment of the tap coefficients of the DFE located in the receiver can be written as:

$$E\{S'_{k-i} * e_k\} = \sigma_S^2 (h_i - q_i),$$

where $q_i$ is the DFE tap coefficient and $\sigma_S^2$ is the power of the received symbols. The symbol decision (S') of the extended symbol constellation must herein be replaced by the symbol decision of the original symbol constellation if the transmitter is not provided with a precoder. The detector error ($e_k$) is equal to $u_k$ if a correct symbol decision ($S'_{k-i} = S_{k-i}$) has been made. Comparison of the above equations reveals that the tap coefficient adjustment terms of the precoder and the DFE are equal if the symbol decisions are equal to the output values of the precoder. Symbol decisions, except for erroneous symbol decisions, are equal to the output values of the precoder if the precoder tap coefficient values are zero. When the values of the precoder tap coefficients are increased, also the difference (power of difference) between the symbol decisions and the output values of the precoder increases.

By simulation, it can be shown that the adjustment of the precoder with the help of the control algorithm of the DFE starting from the zero-reset taps is stable as long as the values of the precoder tap coefficients remain sufficiently small. Herein, it must be admitted that the term "sufficiently small" is difficult to define in an exact manner inasmuch each case is individually subject to strongly varying constraints. If large values of precoder tap coefficients are required for the compensation of channel distortion, the system operation becomes unstable when the control loop has increased the precoder tap coefficients to so high values that the differences between the symbol decisions and the precoder output values grow excessively large.

A practical problem in the method according to the invention arises from the requirement of a correct mutual phase between the receiver input signal values ($d_k$) and the values of the elements ($b_{k-1}, b_{k-2}, b_{k-3}, \ldots$) of the precoder delay line. In an actual situation, this detail can be handled by synchronizing the information on the error variable to the precoder delay line content elements with the help of the line frame synchronization information. Additionally, a functional apparatus needs memory elements for storage of the symbol and delay line content elements until the moment when the information related to their respective error variable has been submitted to the transmitter.

The method according to the invention for adjusting the tap coefficients of a Tomlinson-Harashima precoder in the data transmission state is accomplished as follows:

1. The error variable ($u_k$ or $e_k$) to be used in the adjustment of the precoder is defined as the difference ($d_k - S_k$ or $d_k - S'_k$) between the signal ($d_k$) detected at receiver and the sent symbol (S) or, respectively, the estimated symbol (S'). In the receiver, the signal $d_k$ to be taken at a point where said difference reaches the minimum value of its absolute value when the precoder adjustment is in a steady state.
2. The information ($d_k$ or $e_k$) used in the determination of the error variable value is transmitted from the receiver to the transmitter over an auxiliary channel of the reverse transmit direction.
3. The precoder tap coefficients are adjusted with the help of an LMS algorithm on the basis of the values of the error variable ($d_k - S_k$ or $e_k = d_k - S'_k$) and the precoder delay line content elements ($b_{k-1}, b_{k-2}, b_{k-3}, \ldots$).

Systems according to the invention using the precoder adjustment based on the control scheme of the invention applied during the data transmission state is illustrated in FIGS. 6, 7, 8, 9, 10 and 11. The systems shown therein comprise a Tomlinson-Harashima precoder (TML) that is adjusted by means of the method according to the invention. The computation of the error variable value (subtraction operation) needed for the adjustment of the precoder can be made in either the transmitter or the receiver.

Figure 6:
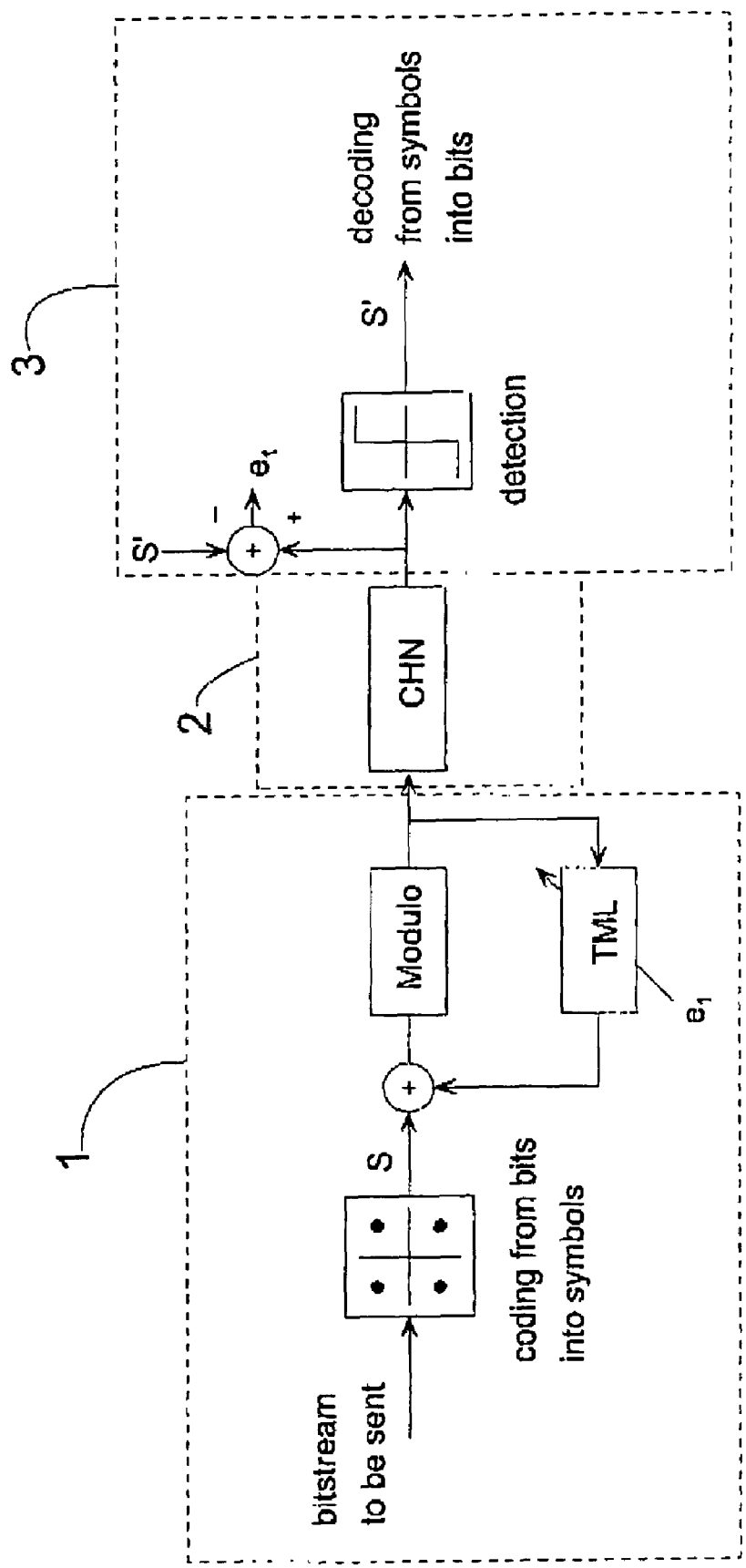
FIG. 6 shows a block diagram of a system according to the invention not having equalizers at its receive end.

In the system shown in FIG. 6, only a precoder is used for implementing the channel equalization. The precoder is adjusted based on the error ($e_1$) that represents the situation preceding detection. Hence, the system illustrated in FIG. 6 is functional only on such channels that do not cause precursor intersymbol interference (precursor ISI), that is, an interaction between successive symbols prior to the instant of decision-making.

Figure 7:
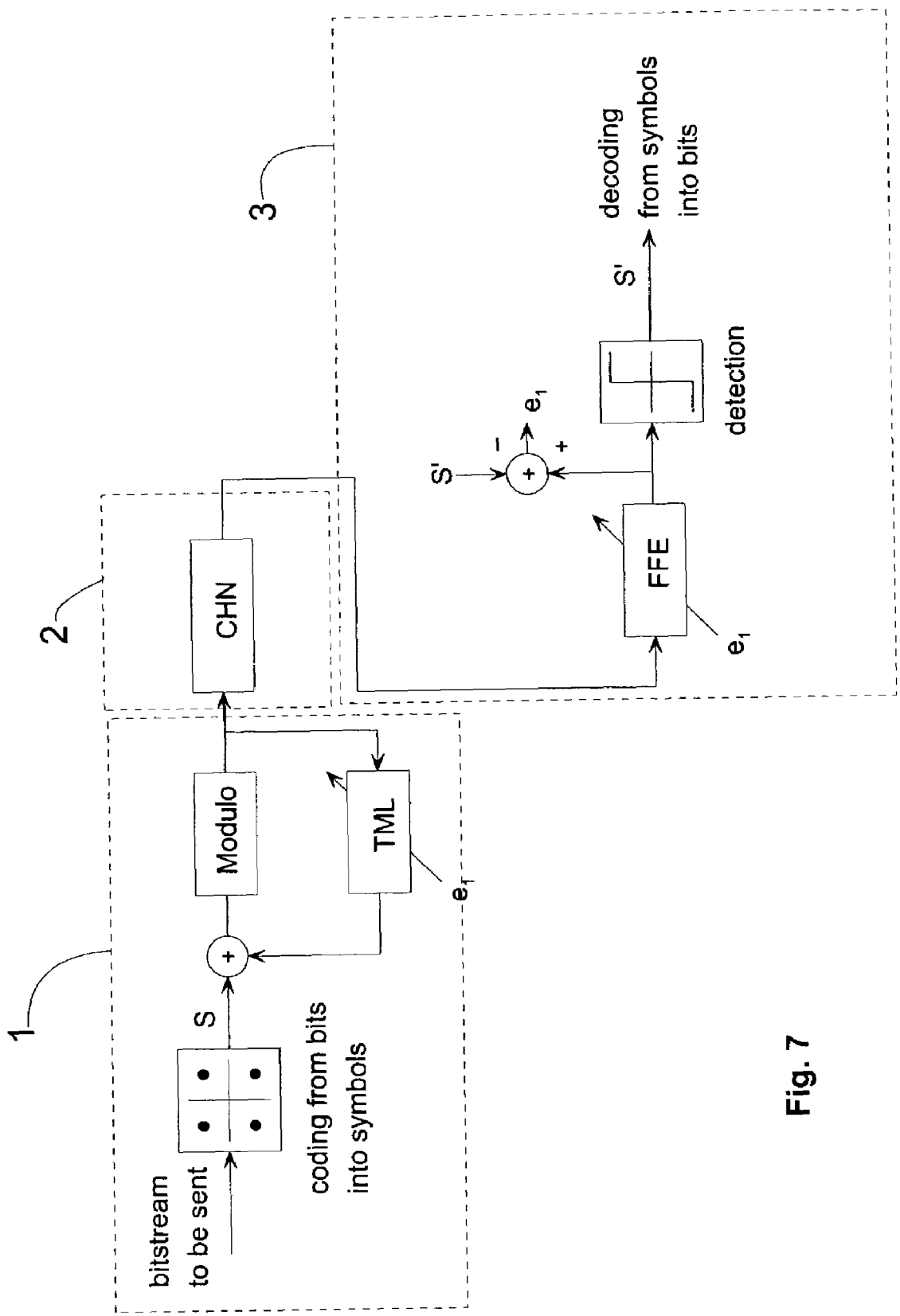
FIG. 7 shows a block diagram of a system according to the invention having merely a linear equalizers at its receive end.

The system shown in FIG. 7 has both a precoder and a linear equalizer in the receiver. The precoder and the linear equalizer are adjusted based on the error ($e_1$) corresponding to the situation preceding detection.

Figure 8:
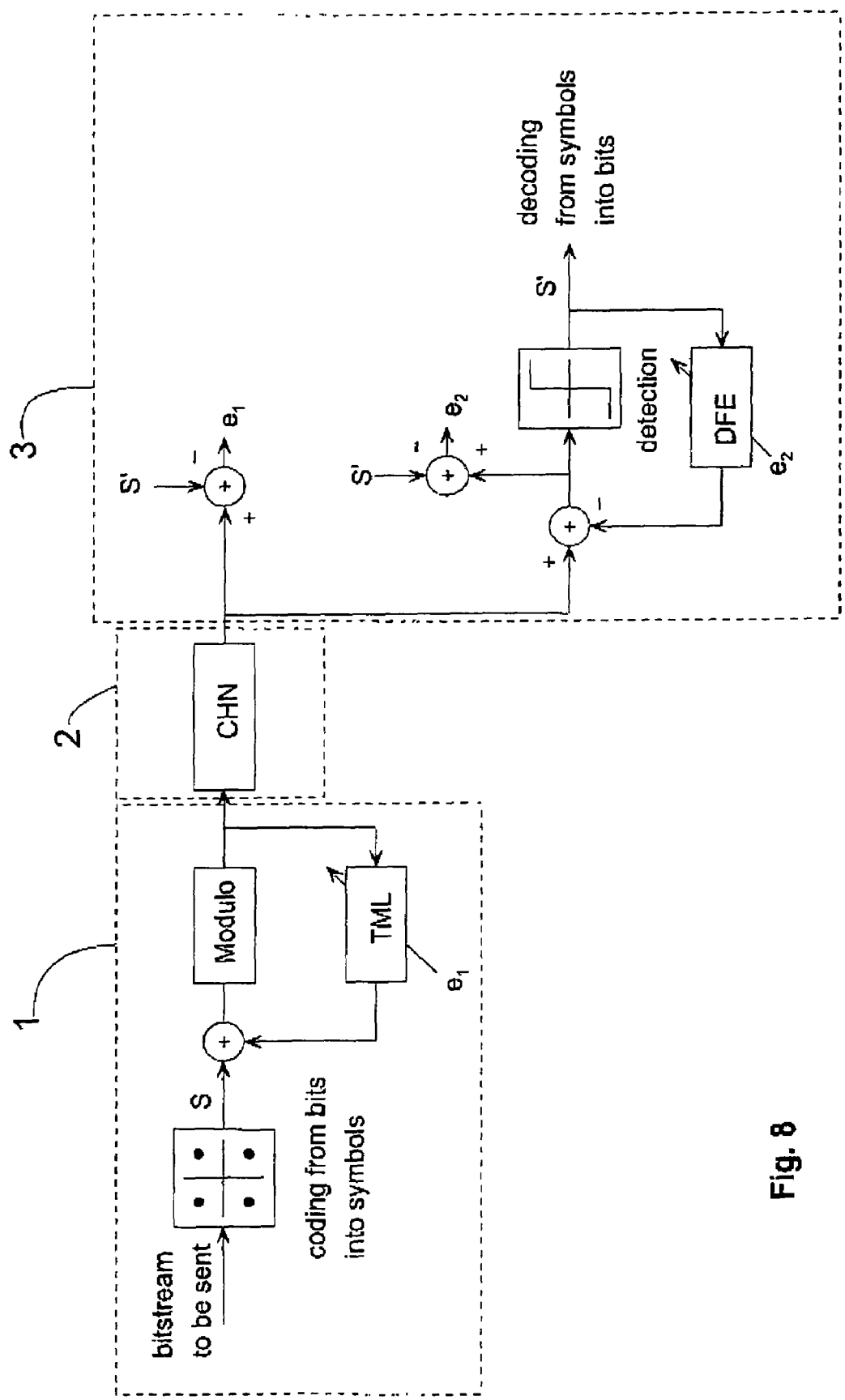
FIG. 8 shows a block diagram of a system according to the invention having only a decision-feedback equalizer at its receive end.

The system shown in FIG. 8 has a precoder and a decision-feedback equalizer (DFE) in the receiver. The precoder is adjusted based on the error ($e_1$) corresponding to the situation before the receive signal is corrected by the effect of the DFE. The DFE is adjusted in a conventional manner based on the value of the error $e_2$. The system shown in FIG. 8 is functional only on such channels that do not cause precursor ISI.

The communications of the error variable information between the receiver and the transmitter and the need for synchronization between the transmitted information and the values of the precoder delay line content elements make this kind of precoder adjustment slow in practical operation. Generally, such slow response is not a major problem, because the goal of the equalizer adjustment during the data transmission state is to respond to changes in the characteristics of the communications channel 2 that, due to temperature variations, occur at a slow rate. Hence, the system illustrated in FIG. 7 is suited for a major number of practical situations. However, there may also appear needs for a fast adjustment of the decision-feedback equalizer. An example of such a case represents a situation where a narrowband interference falling on the signal transmission spectrum must be eliminated by a stop band (spectral null) created in the linear equalizer. While the stop band generated by the linear equalizer manages to eliminate the interference, it also causes in the data signal a distortion that must be compensated for by adapting the decision-feedback equalizer to the new situation. In this kind of a case, the adjustment rate of the decision-feedback equalizer must be in the same order with the adjustment rate of the linear equalizer.

Figure 9:
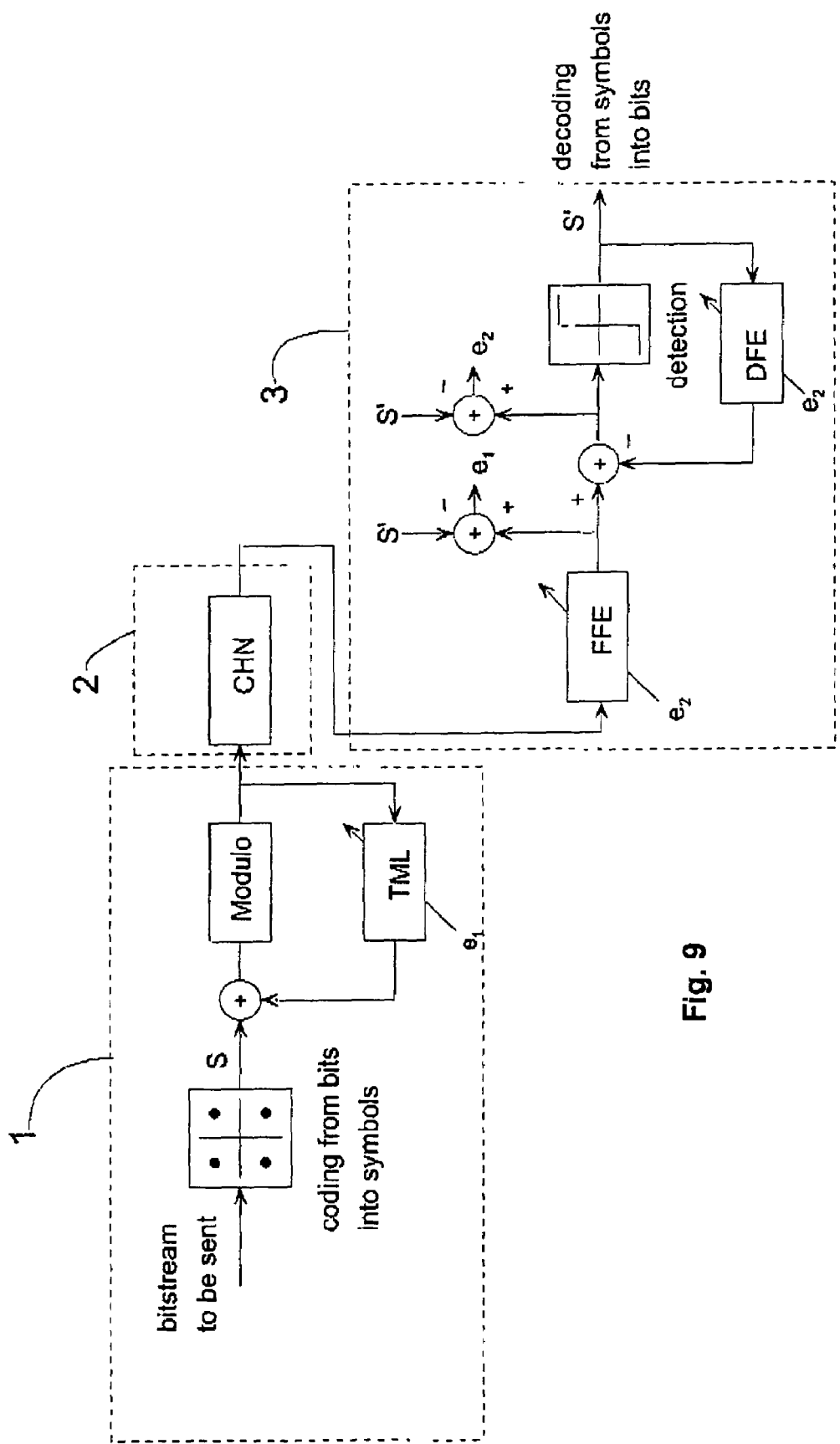
FIG. 9 shows a block diagram of a system according to the invention having both a linear equalizer and a decision-feedback equalizer.
Figure 10:
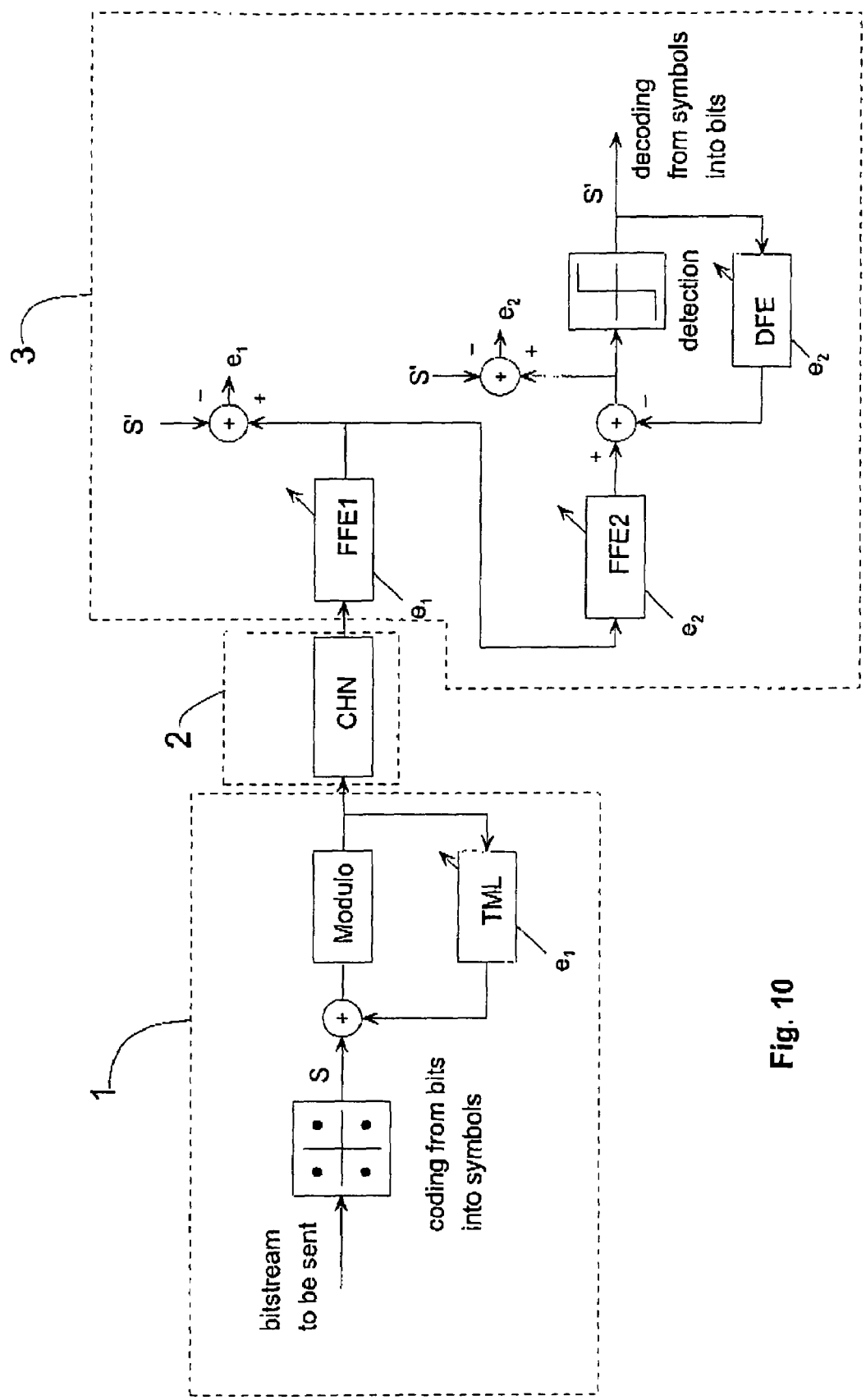
FIG. 10 shows a block diagram of a system according to the invention that has the linear equalizer divided into two separate equalizers in a cascaded configuration and further includes a decision-feedback equalizer.
Figure 11:
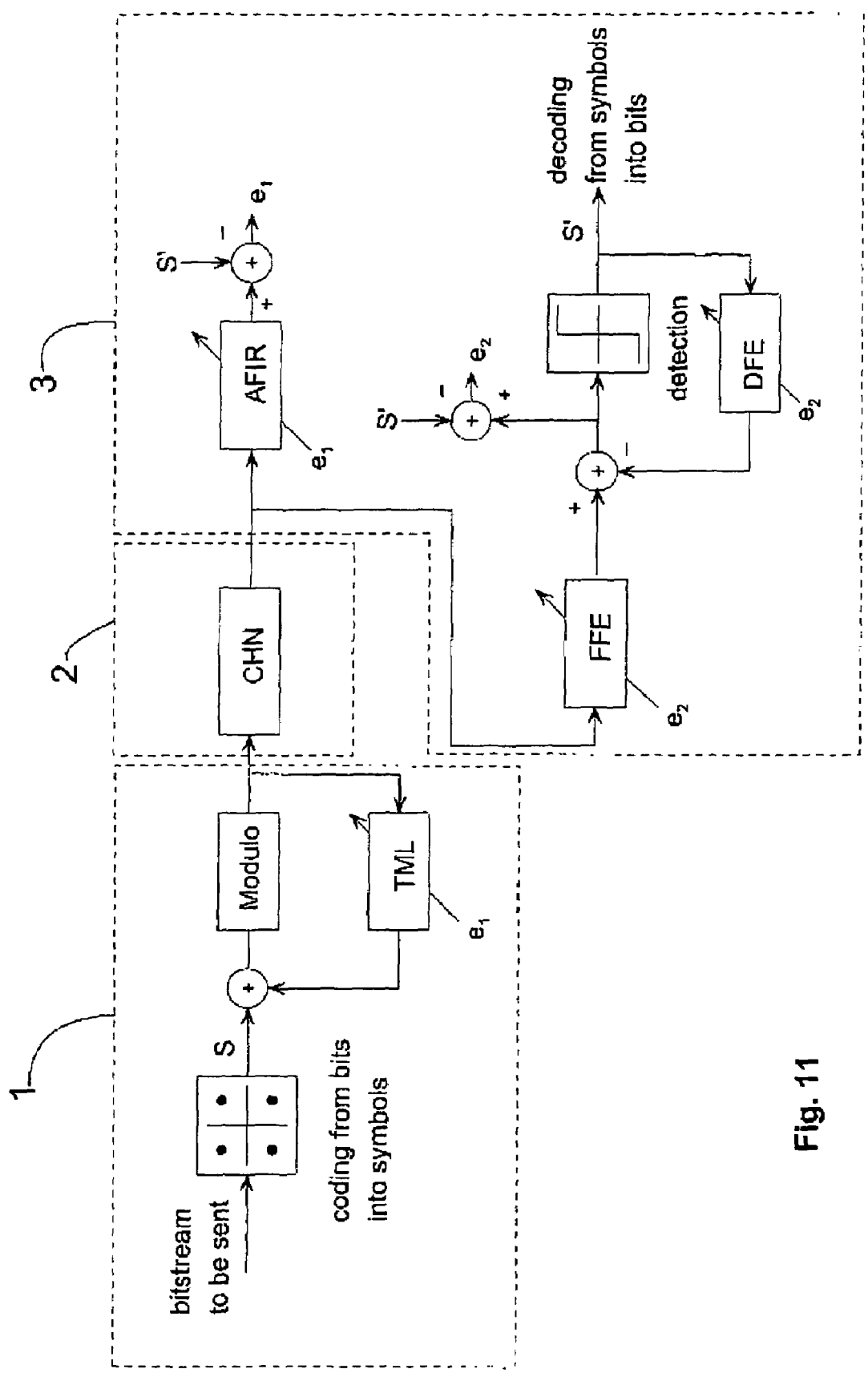
FIG. 11 shows a block diagram of a system according to the invention that has the linear equalizer paralleled with an adaptive filter (that is, a second linear equalizer) and further includes a decision-feedback equalizer.

Embodiments according to the invention serving to solve the above-described problems are illustrated in FIGS. 9, 10 and 11.

The system shown in FIG. 9 has a precoder and a linear equalizer (FFE) in the receiver, complemented with a decision-feedback equalizer (DFE). The precoder is adjusted based on the value of the error ($e_1$) in the signal immediately after the linear equalizer. The linear equalizer and the DFE are adjusted in a conventional manner based on the value of the error $e_2$.

Next, a situation is discussed wherein fast adaptation of equalization is needed and adaptation of the linear equalizer alone is insufficient. The linear equalizer and the DFE have a fast response and hence are quickly adapted to the changed situation. As to the precoder, the situation is similar to a system configuration having no DFE, because $e_1 = e_2$ if the output of the DFE is zero. Resultingly, the precoder adapts at its inherent adaptation rate so as to make the error $e_1$ smaller. The linear equalizer and the DFE detect the adaptation of the precoder in the same manner as any slow change in the communications channel 2 and adjust themselves accordingly. The effect of post cursor ISI is eliminated from the output signal of the linear equalizer as soon as the precoder has reached a new steady state. Hereupon, the tap coefficients of the DFE should be (almost) zero and, in a practical situation, the tap coefficients have been adjusted to zero or a low value during the adaptation period of the precoder.

The method according to the invention makes it possible to configure a system wherein the DFE of the receiver can respond to needs of fast adaptation, but still the compensation settings of the DFE for channel distortion can be reflected to the transmitter at the speed determined by the adjustment rate of the precoder. This arrangement limits the increase of tap coefficients in the DFE and thus reduces the feedback of receive error.

In the system shown in FIG. 9, the DFE is involved with the adjustment process of the precoder, because the DFE affects the error $e_2$ on the basis of which the linear equalizer is adjusted that in turn affects the error $e_1$. Resultingly, the system stability is deteriorated at certain mutual adjustment rates of the precoder, the linear equalizer and the DFE. Hence, the system illustrated in FIG. 9 requires careful design in respect to these adjustment rates.

A situation, wherein the DFE does not affect the adjustment of the precoder, can be accomplished by using systems illustrated in FIGS. 10 and 11. In the system shown in FIG. 10, the linear equalizer is divided in two cascaded separate linear equalizers (FFE1 and FFE2). The precoder and the first linear equalizer (FFE1) are adjusted based on the error ($e_1$) measurable at the output of the first linear equalizer. The second linear equalizer (FFE2) and the DFE are adjusted in a conventional manner based on error $e_2$. During operation, the precoder seeks determined by its inherent adjustment rate toward a situation wherein no feedback equalization is needed in the receiver. This arrangement avoids the use of high tap coefficient values in the DFE. The sampling rates of the cascaded adaptive filters FFE1 and FFE2 can be equal or different. Furthermore, the sampling rates can be equal to the symbol rate, multiples thereof or rational number multiples thereof. According to a preferred embodiment, the sampling rate of FFE1 is a multiple of the symbol rate (fractional spaced equalizer) and the sampling rate of FFE2 is equal to the symbol rate. According to another preferred embodiment, the sampling rates of both filters FFE1 and FFE2 can be equal to or multiples of the symbol rate.

In the system shown in FIG. 11, the linear equalizer (FFE) is paralleled by another adaptive FIR filter (AFIR) that also is a linear equalizer. The precoder and the adaptive filter (AFIR) are adjusted based on the error ($e_1$) measurable at the output of the adaptive filter. The linear equalizer (FFE) and the DFE are adjusted in a conventional manner based on error $e_2$. Also in this system, the precoder seeks determined by its inherent adjustment rate toward a situation wherein no feedback equalization is needed in the receiver, thus avoiding high tap coefficient values in the DFE. An advantage of this arrangement is that the adaptive filter AFIR needs adjustment and coefficient computation only when the precoder is being adjusted. Hence, the AFIR filter can be implemented computationally without the need for complicated ASIC design.

In the above-described systems illustrated in FIGS. 6 . . . 11, the linear equalizer and/or the decision-feedback equalizer (DFE) of the receiver may in certain cases be such that needs no adjustment during the data transmission state. Furthermore, the linear equalizer and/or the DFE may comprise an entirely fixed filter configuration, whereby this filter is not adjusted even during the training period. Obviously, the replacement of an adaptive equalizer by an entirely fixed configuration or a configuration which is not adjustable during the training period compromises the system capability of adapting to changes in the communications channel parameters.

REFERENCES

[Lee & Messerschmitt] E. A. Lee and D. G. Messerschmitt, *Digital Communication*, Kluwer Academic Publishers, 1994.

What is claimed is:

1. A method for implementing channel equalization on a digital communications path, the method comprising:
   in a transmitter, converting an outgoing bit stream into symbols to be sent,
   compensating for a channel distortion with a Tomlinson-Harashima precoder in the transmitter,
   sending precoded symbols to a communications channel, a signal represented by the precoded symbols constituting a channel output signal at a destination end of the communication channel, and
   in a receiver, forming estimated symbol values on the basis of the channel output signal and recovering the bit stream on the basis of the estimated symbol values,
   wherein, during a data transmission state, the method further comprises:
      performing adjustment of tap coefficients of the Tomlinson-Harashima precoder based on content values of a delay line of the Tomlinson-Harashima precoder and a value of an error variable that is dependent on the difference between a signal measurable in the receiver and one of the following:
         a sent precoded symbol value if the value of the error variable is calculated in the transmitter, and
         an estimated symbol value used by the receiver to recover the bit stream if the value of the error variable is calculated in the receiver,
      wherein said measurable signal is measured in the receiver at a point where an absolute value of said difference is minimized when the adjustment is in a steady state, and
      synchronizing the error variable with the content values of the delay line of the Tomlinson-Harashima precoder with the aid of line frame synchronization information.

2. A method according to claim 1, wherein the value of the error variable is computed at the receiver.

3. A method according to claim 1, wherein the value of the error variable is computed in the transmitter.

4. A method according to claim 1, wherein the channel distortion is compensated in the receiver with a linear equalizer, and an output signal of said linear equalizer is processed to obtain the value of the error variable that is used for the adjustment of the tap coefficients of the Tomlinson-Harashima precoder and for adjustment of said linear equalizer.

5. A method according to claim 1, wherein
   the channel distortion is compensated in the receiver with a linear equalizer and with a decision-feedback equalizer,
   an output signal of said linear equalizer is processed to obtain the value of the error variable that is used for adjustment of the tap coefficients of the Tomlinson-Harashima precoder, and
   a value of another error variable associated with an input signal of a receiver detector is used for adjusting the linear equalizer and the decision-feedback equalizer.

6. A method according to claim 1, wherein the channel distortion is compensated for in the receiver with a decision-feedback equalizer and with two cascaded linear equalizers that are comprised of a first linear equalizer and a second linear equalizer, an output signal of said first linear equalizer is processed to obtain the value of the error variable that is used for the adjustment of the tap coefficients of the Tomlinson-Harashima precoder and for adjustment of said first linear equalizer, and a value of another error variable associated with an input signal of a receiver detector is used for adjusting the second linear equalizer and the decision-feedback equalizer.

7. A method according to claim 1, wherein the channel distortion is compensated in the receiver with a decision-feedback equalizer and with two parallel linear equalizers that are comprised of a first linear equalizer and a second linear equalizer, an output signal of said first linear equalizer is processed to obtain the value of the error variable that is used for the adjustment of the tap coefficients of the Tomlinson-Harashima precoder and for adjustment of said first linear equalizer, an output of said second linear equalizer is coupled to an entity formed by a receiver detector and the decision-feedback equalizer, and a value of another error variable associated with an input signal of the receiver detector is used for adjusting said second linear equalizer and the decision-feedback equalizer.

8. A method according to claim 1, wherein the adjustment of the tap coefficients of the Tomlinson-Harashima precoder is performed using a least-mean-squares algorithm based on the content values of the delay line of the Tomlinson-Harashima precoder and the value of the error variable.

9. A method according to claim 8, wherein adjustment of a tap coefficient $v_i$ of the Tomlinson-Harashima precoder is performed using a tap coefficient control algorithm written as $v_i^{new}=v_i+\mu b_{k-i}^{*}u_k$ where $v_i^{new}$ is an updated value of the tap coefficient, $v_i$ is the value of the tap coefficient prior to the update operation, $b_{k-i}^{*}$ is a conjugate value of a content value of the precoder delay line and, $u_k$ is the value of the error variable and $\mu$ is a control step.

10. A system for implementing channel equalization on a digital communications path, the system comprising:

a transmitter including means for converting a bit stream into symbols to be sent and a Tomlinson-Harashima precoder for compensating for a channel distortion, a communications channel for transferring precoded symbols, a signal represented by the precoded symbols constituting a channel output signal at a destination end of the communications channel, and a receiver including signal processing means for forming estimated symbol values on the basis of the channel output signal and recovering the bit stream on the basis of the estimated symbol values, a device for performing adjustment of tap coefficients of the Tomlinson-Harashima precoder during a data transmission state based on content values of a delay line of the Tomlinson-Harashima precoder and a value of such an error variable that is dependent on a difference between a signal measurable in the receiver and one of the following:

a sent precoded symbol value if the value of the error variable is calculated in the transmitter, and an estimated symbol value used by the receiver to recover the bit stream if the value of the error variable is calculated in the receiver, wherein said measurable signal is measured in the receiver at a point where an absolute value of said difference is minimized when the adjustment is in a steady state, a device for determining the value of the error variable, and a device for synchronizing the error variable with the content values of the delay line of the Tomlinson-Harashima precoder with the aid of line frame synchronization information.

11. A system according to claim 10, wherein the receiver includes a linear equalizer and a device for processing an output signal of said linear equalizer to obtain the value of the error variable that is used for the adjustment of the tap coefficients of the Tomlinson-Harashima precoder and for adjustment of said linear equalizer.

12. A system according to claim 10, wherein the receiver includes a linear equalizer, a decision-feedback equalizer, a device for processing an output signal of said linear equalizer to obtain the value of the error variable for the adjustment of the tap coefficients of the Tomlinson-Harashima precoder, and a device for adjusting the linear equalizer and the decision-feedback equalizer with a value of another error variable associated with an input signal of a receiver detector.

13. A system according to claim 10, wherein the receiver includes a decision-feedback equalizer, two cascaded linear equalizers that are comprised of a first linear equalizer and a second linear equalizer, a device for processing an output signal of said first linear equalizer to obtain the value of the error variable for the adjustment of the tap coefficients of the Tomlinson-Harashima precoder, a device for adjusting said first linear equalizer with the value of the error variable, a device for coupling an output of said second linear equalizer to an entity formed by a receiver detector and the decision-feedback equalizer, and a device for adjusting the second linear equalizer and the decision-feedback equalizer with a value of another error variable associated with an input signal of the receiver detector.

14. A system according to claim 10, wherein the receiver includes a decision-feedback equalizer, two paralleled linear equalizers that are comprised of a first linear equalizer and a second linear equalizer, a device for processing an output signal of said first linear equalizer to obtain the value of the error variable for the adjustment of the tap coefficients of the Tomlinson-Harashima precoder, a device for adjusting said first linear equalizer with the value of the error variable, a device for coupling an output of said second linear equalizer to an entity formed by a receiver detector and the decision-feedback equalizer, and a device for adjusting the second linear equalizer and the decision-feedback equalizer with a value of another error variable associated with an input signal of the receiver detector.

15. A transmitter for implementing channel equalization on a digital communications path, the transmitter comprising:

a device for converting a bit stream into symbols, a device for sending the symbols to a channel on the digital communications path;

a Tomlinson-Harashima precoder for compensating for a channel distortion, a device for performing adjustment of tap coefficients of the Tomlinson-Harashima precoder (TML) during a data transmission state based on content values of a delay line of the Tomlinson-Harashima precoder and on such an error variable an absolute value of which attains its minimum when the adjustment is in a steady state, a device for receiving from a reverse direction auxiliary channel a signal measured in a receiver, a device for determining a value of the error variable based on a difference between received measured signal and a value of one of the sent symbols, and a device for synchronizing the error variable with the content values of the delay line of the Tomlinson-Harashima precoder with the aid of line frame synchronization information.

* * * * *